United States Patent
Phillips et al.

(10) Patent No.: US 6,877,988 B2
(45) Date of Patent: Apr. 12, 2005

(54) DOOR BREACH TRAINING SYSTEM AND METHOD OF USE

(76) Inventors: Darron Phillips, 108 Mountain Echo, SA., TX (US) 78258; Jeff Wright, 31950 Oak Ridge, Bulverde, TX (US) 78163

( * ) Notice: Subject to any disclaimer, the term of this patent is extended or adjusted under 35 U.S.C. 154(b) by 0 days.

(21) Appl. No.: 10/662,951

(22) Filed: Sep. 15, 2003

(65) Prior Publication Data

US 2005/0058974 A1 Mar. 17, 2005

(51) Int. Cl.[7] .............................................. G09B 19/00
(52) U.S. Cl. ...................................... 434/226; 434/219
(58) Field of Search ................................ 434/219, 226, 434/247, 258; 49/381, 394, 504

(56) References Cited

U.S. PATENT DOCUMENTS

| | | | | |
|---|---|---|---|---|
| 5,203,707 A | * | 4/1993 | Musto et al. ............... | 434/226 |
| 5,752,835 A | * | 5/1998 | Whitmer, Sr. ............... | 434/226 |
| 5,906,493 A | * | 5/1999 | Bishop ....................... | 434/226 |
| 6,179,620 B1 | * | 1/2001 | Schmid ....................... | 434/226 |
| 6,358,057 B1 | * | 3/2002 | Bishop ....................... | 434/226 |

OTHER PUBLICATIONS

"Ballistics Technology International", Jun. 2002 <retrieved online Nov. 4, 2004>.*

* cited by examiner

*Primary Examiner*—Kurt Fernstrom
(74) *Attorney, Agent, or Firm*—David Henry

(57) ABSTRACT

A door breach training system and related method of use thereof. The system includes a door and frame with replaceable shear pins which are designed to break under known pressures to replicate pressures required to breach doors of varying physical characteristics and lock configurations.

5 Claims, 4 Drawing Sheets

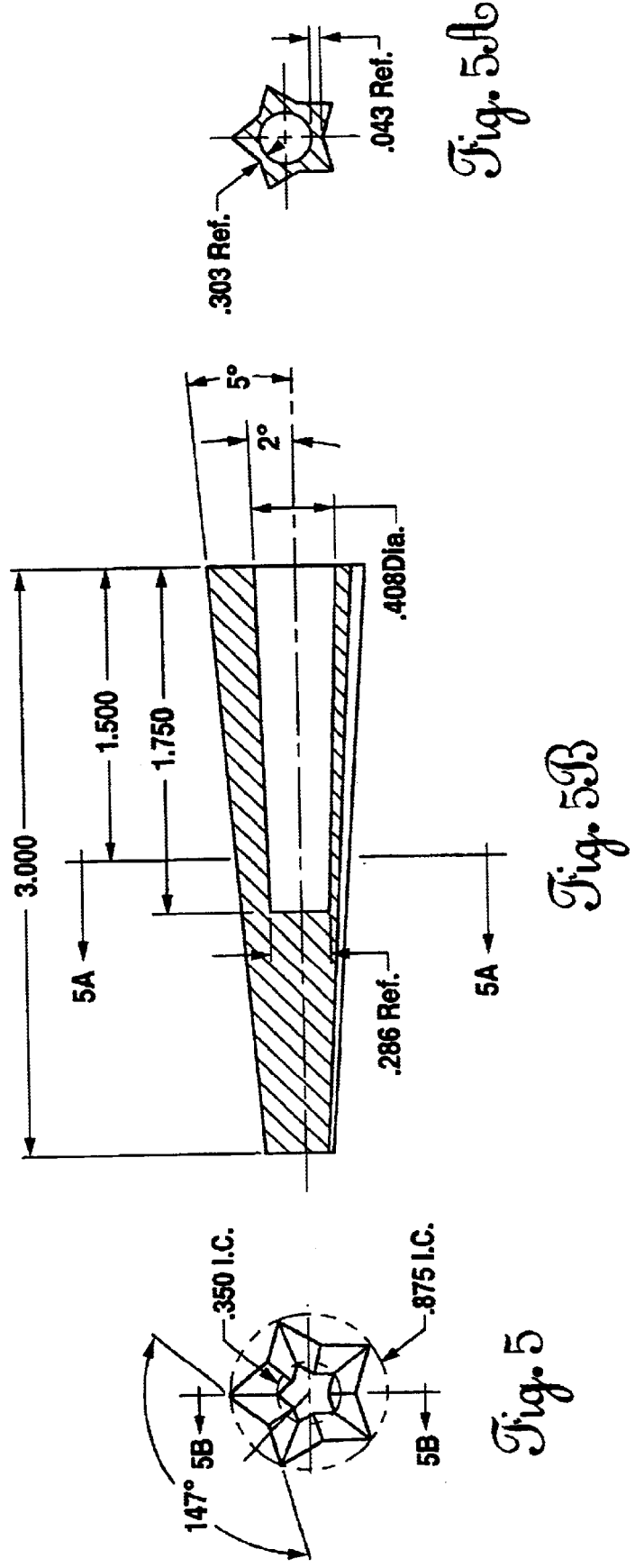

DOOR BREACH TRAINING SYSTEM AND METHOD OF USE

BACKGROUND OF THE INVENTION

1. Field of the Invention

The present invention relates to training devices for public safety officers and cadets.

2. Background Information

Public Safety personnel (e.g. fire fighters, police, sheriff, SWAT team, FBI and ATF officers), as well as military personnel are often faced with the need to perform a forced entry into structures. A forced entry can be, and often is a life-threatening scenarios, where every second counts.

Variations in door breaching technique, how ever slight, as well as practice and conditioning for the operation are vital in shaving seconds from the operation—seconds which can span the difference between life-saving tactical surprise and life-ending ambush.

Presently, forced entry training is performed using conventional doors and door frames. While this certainly provides realistic training opportunities, such an approach is quite costly for self-evident reasons (not only the cost of constantly replenishing door supplies, but the installations costs as well). While few would admit (even if aware of the fact) to trading of life-saving training for savings in door costs, many training facilities are through to limit door breach training to something of a practical minimum, simply because of the present cost implications.

Clearly, it would well serve those who perform emergency or law enforcement-related door breaching operations, as well as those civilians whose lives often depend on such operations (entrapped fire victims and hostages, for example) to provide an alternative means of training for door breach operations, which, because of considerably favorable cost efficiency when compared to conventional training options, and resulting lower resistance to more thorough and repeated practice training, results in more effective implementation of door breaching operations in the field.

SUMMARY OF THE INVENTION

In view of the foregoing, it is an object of the present invention to provide a novel, unobvious and beneficial door breach training system and related method of use thereof for use in cost-effectively training public safety, law enforcement and military personnel in door breach operations.

It is another object of the present invention to provide a door breach training system and related method of use thereof for use by public safety, law enforcement and military personnel in training for door breach operations, which system and method obviates the need for destruction of conventional doors and the associated costs related thereto.

It is another object of the present invention to provide a door breach training system and related method of use thereof for use by public safety, law enforcement and military personnel in training for door breach operations, which system and method facilitates repeated training exercises without the consumption of expensive supplies or equipment.

It is another object of the present invention to provide a door breach training system and related method of use thereof for use by public safety, law enforcement and military personnel in training for door breach operations, which system and method permits training for breaching doors of differing breach resistance without substantial or expensive modification to such system.

In satisfaction of these and related objects, the present invention provides a door breach training system and associated method for use thereof in the training of public safety, law enforcement and military personnel for door breach operations. The system and method is based, in its preferred mode, on a substantially indestructible (relatively speaking) door and frame assembly which, despite its substantial resistance to literal destruction in the conventional sense, is user-configurable to present varying degrees of resistance to breach in order to mimic real world doors of varying breach-resistant characteristics (hollow, solid, wood, metal, reinforced, etc.). The system includes user-replaceable shear pins which are engineered to shear substantially at known force levels which, respectively, present the breach resistance of the varying door types just mentioned.

After each use of the present system, the then sheared pins are simply replaced (with very inexpensive replacement pins) for the next exercise, with no need to replace an expensive door or frame, and very little time involved to "re-set" the system.

The present system is believed to present an opportunity for substantial savings to training facilities and their sponsor organizations, as well as provide a subtle incentive for more thorough, frequent and effective training in vital door breach operations.

BRIEF DESCRIPTION OF THE DRAWINGS

FIG. 5 depicts specific dimensions and geometry of the preferred pin for use in the present system and method.

DETAILED DESCRIPTION OF THE PREFERRED EMBODIMENT

Figure 1:
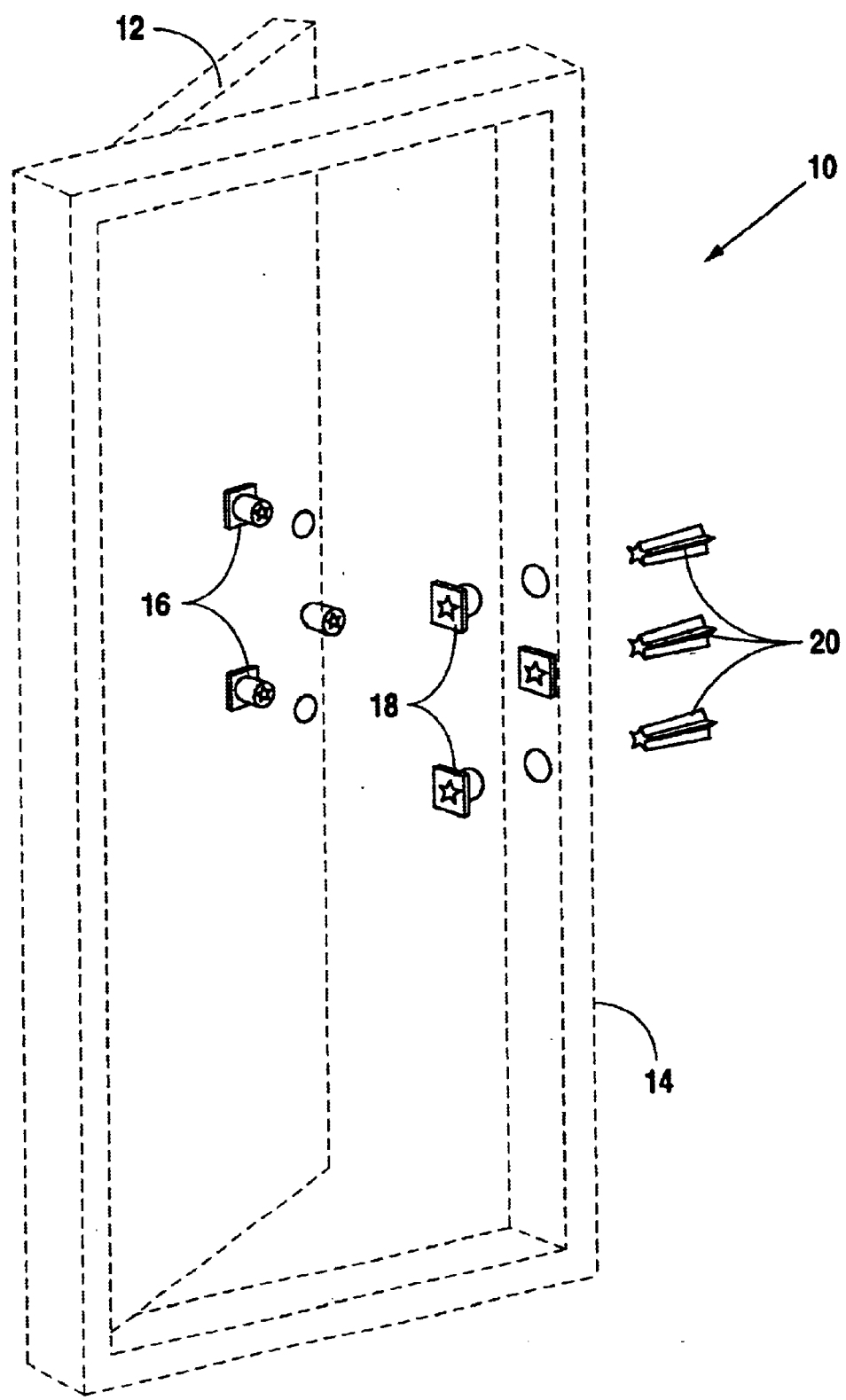
FIG. 1 is a perspective view of the door breaching training system of the present invention.
Figure 2:
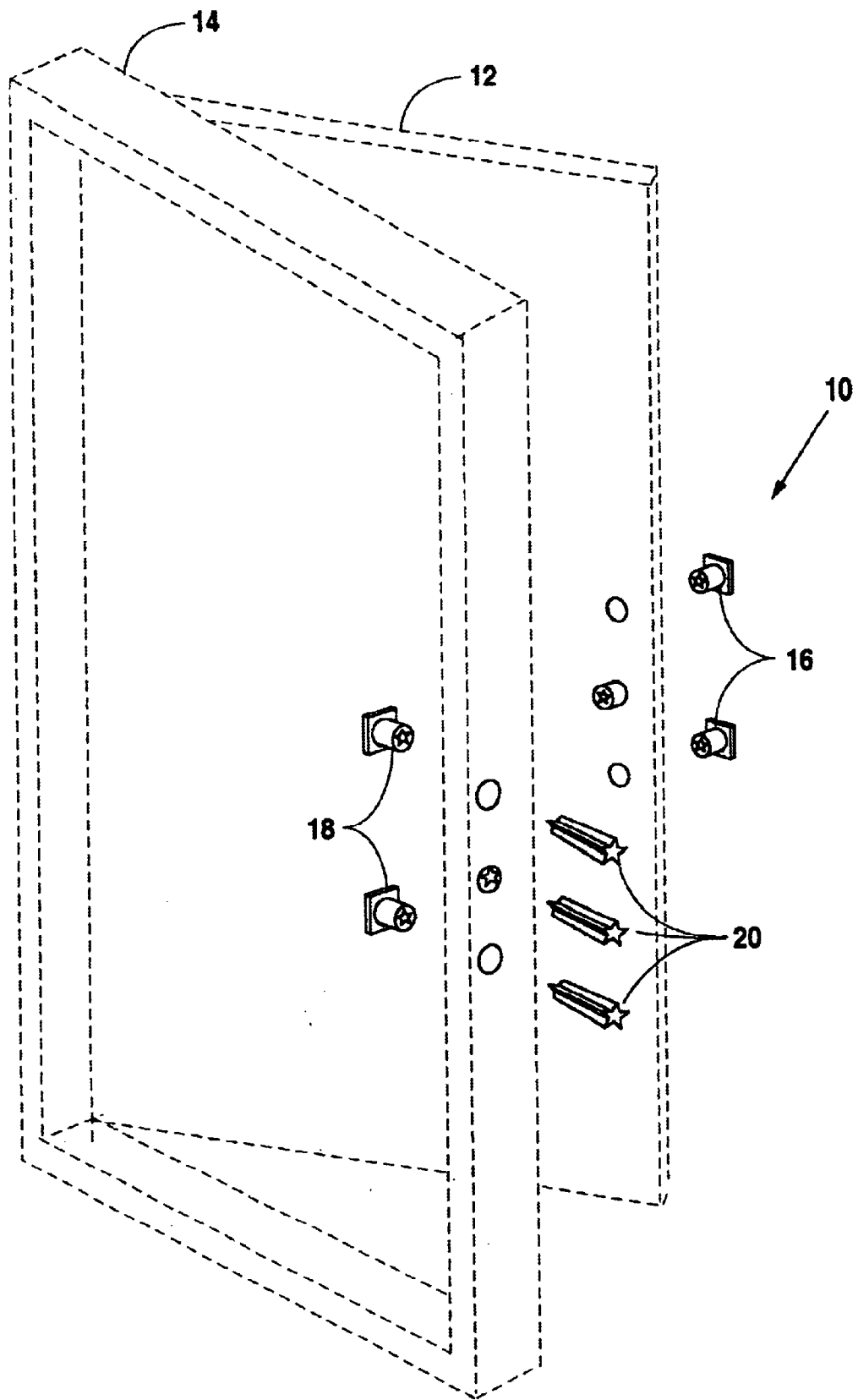
FIG. 2 is a second perspective view of the door breaching training system of the preferred embodiment.

Referring to FIGS. 1 and 2, the door breach training system of the present invention is identified generally by the reference numeral 10. System 10 includes a door 12 and an associated door frame 14.

To simulate the locks within the training system, embodiments of the present invention include door sockets 16, frame sockets 18, and shear pins 20.

Door sockets 16 are inserted into door 12, while frame socket 18 is inserted into the door frame 14. The number of door sockets 16 and corresponding frame sockets 18 utilized for any given exercise can be user-varied to represent the number of locks, or the over-all breach resistance to be simulated in any given exercise.

Figure 3:
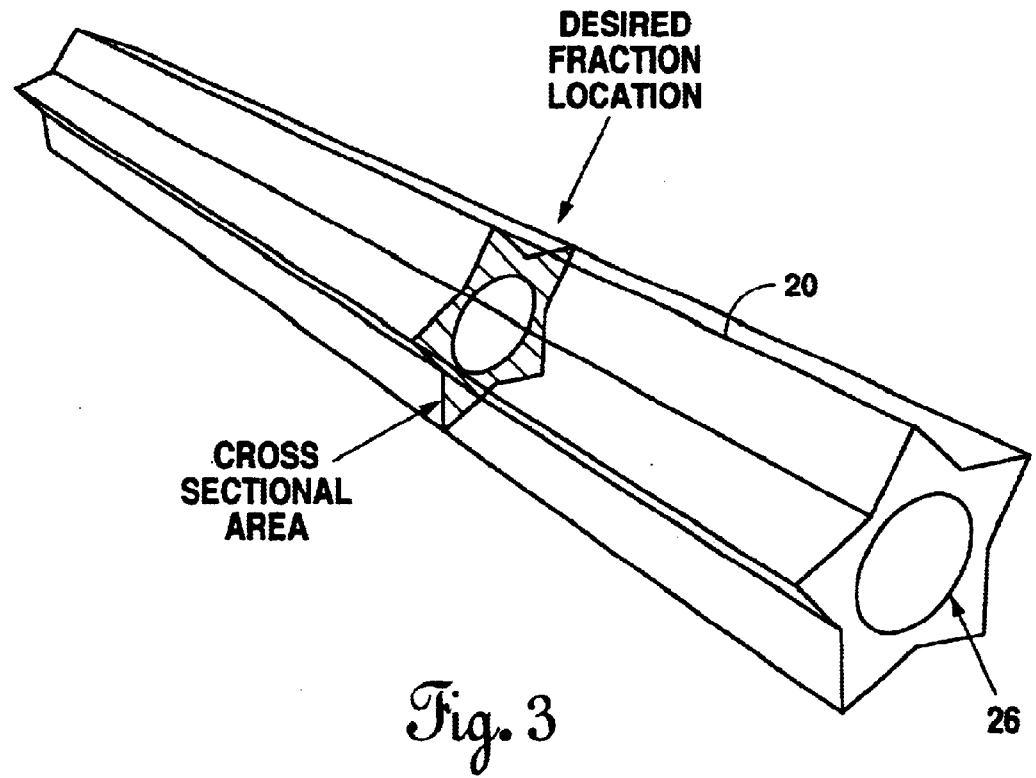
FIG. 3 is a perspective view of the preferred embodiment of the replaceable pin of the present invention.

Referring in combination to FIGS. 1, 2 and 3, to complete a set-up for an exercise, door 12 is placed in its conventional "closed" position relative to door frame 14, and the appropriate pin(s) 20 for representing the desired condition (such as wood door and metal frame, etc) are inserted to engage the bores 22 and 24, respectively, of both door sockets 16 and frame sockets 18.

Upon forced entry of a trainee, the resistance force of pin(s) 20 simulates that encountered in field forced entry. Once door 12 has been breached or entered, pin(s) 20 are simply removed and the system 10 can be reset for the next trainee.

By collecting data from numerous physical breaching tests on doors and frames of different construction, an engineered pin has been developed which when utilized in the designed system replicates the same forces and impact resistance found in field conditions as encountered by public safety personnel. The engineered pins not only involve the shape and form of the pin but also the material properties of construction. This results in various pin types being used to simulate various conditions. When utilized with a fortified door and frame, the overall system is engineered to fail in a controlled, repeatable and measurable manner with the pins being the only consumable for training.

Figure 4:
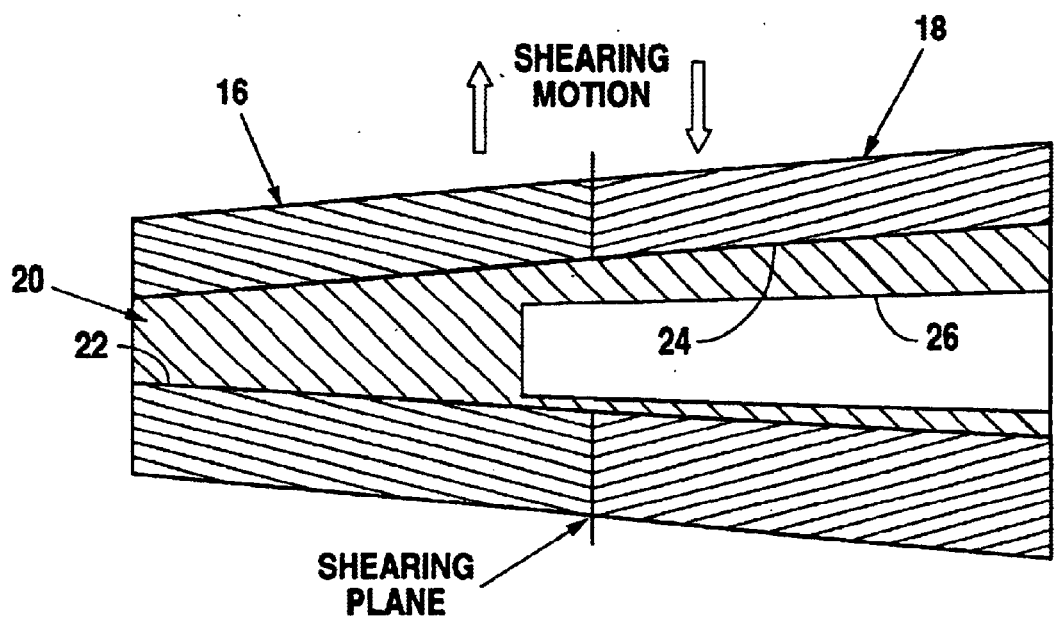
FIG. 4 is a sagittal cross sectional view of the pin of FIG. 3 shown received within door frame and door sockets as in a pre-exercise position.

Referring to FIGS. 3, 4 and 5, the preferred pins 20 for use in embodiments of the present invention are made of unfilled polycarbonate with a known shear strength of 4675 psi, and are configured as shown. The core hole 26 of each pin 20 will vary, depending on the type of pin 20 to be constructed. For example, a "wood frame type" pin 20 will, when made of the above polycarbonate, material, and according to the depicted geometry, have a core hole diameter of 0.303 inches (for a resulting 0.121 sq. inch material for this type pin 20), a "metal frame type" pin 20 will have a 0.217 diameter (for a resulting 0.217 sq. inch material for this type pin 20), and a reinforced type pin 20 will have no core hole at all.

By the use of test data from physical testing of various combinations of door and frame construction, pin 20 constitutes a preferred, calculated geometry (shown in FIG. 5) and material property, which results in a failure replicating that of the test data. This allows pins of identical overall dimension, but varying internal geometry (bore size of sockets 22 and 24) and material property to be utilized in the same sockets while simulating totally different breaching scenarios or conditions. Clearly variations of the depicted geometry, dimensions and/or materials will still fall within the scope of the present invention, but those shown are now believed to be optimal, based on present tests and analysis.

Tests by the present inventor reveal that the average wood frame door with a single bolt (deadbolt or doorknob type) required approximately 480 lbs. pressure for door breach, while a metal frame door of the same configuration required an average 645 lbs. of pressure. The addition of more locks or bolts varies the pressure.

If using the presently engineered pins as previously described, the following are examples of appropriate configurations for training exercises:

Wood frame door with doorknob bolt and additional deadbolt—Use 2 "wood type" pins 20 for breaching force requirement of 960 lbs;

Metal frame door with doorknob bolt and additional two deadbolts—Use 3 "metal type" pins 20 for breaching force requirement of 1935 lbs; and Reinforced door—Use 3 "reinforced type" pins 20 for breaching force requirement of 2640 lbs.

Note that all holes are tapered 4° from the opening at the open end of pin 20.

Clearly, variations in pin configuration and material constituency can vary the pin requirements for the above examples, but an analogous concept would fall within the scope of the present invention.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A door breach training system comprising:
a door frame;
a door member hingedly attached to said door frame;
a door socket receptacle opening to an outer perimeter of said door member;
a door frame socket receptacle positioned in said door frame positioned for opposing said door socket receptacle in a coaxial orientation;
a door socket member with a door socket pin receptacle formed therein;
a door frame socket member with a door frame socket pin receptacle formed therein; and
a first replaceable pin member sized and shaped for simultaneously extending, at opposite ends of said pin member, into both said door frame socket pin receptacle and said door socket pin receptacle, while spanning a space between said door member and said door frame.

2. The system of claim 1 further comprising a second replaceable pin member for replacement of said first replaceable pin member upon the shearing thereof during a use of such system in a training exercise.

3. The system of claim 1 further comprising a plurality of replaceable pin members differing in one or more dimensions between one another and thereby exhibiting differing shear force characteristics.

4. A method of training door breach operations comprising the steps of:
Selecting a door breach training system comprising:
a door frame;
a door member hingedly attached to said door frame;
a door socket receptacle opening to an outer perimeter of said door member;
a door frame socket receptacle positioned in said door frame positioned for opposing said door socket receptacle in a coaxial orientation;
a door socket member with a door socket pin receptacle formed therein;
a door frame socket member with a door frame socket pin receptacle formed therein; and
a replaceable pin member sized and shaped for simultaneously extending, at opposite ends of said pin member, into both said door frame socket pin receptacle and said door socket pin receptacle, while spanning a space between said door member and said door frame;
placing said door member in a closed position relative to said door frame;
positioning a first said replaceable pin member in a pre-exercise position wherein said pin member extends into both said door frame socket pin receptacle and said door socket pin receptacle, spanning said space between said door member and said door frame;
impacting said door with force sufficient to shear said replaceable pin member and open said door member;
replacing said first replaceable pin member with a second said replaceable pin member in said pre-exercise position; and
repeating said impacting step.

5. The method of claim 3 further comprising the step, before said positioning of said first replaceable pin member, of selecting said first replaceable pin member from alternative specification variant replaceable pin members, such variant specifications representing differing force required to shear said replaceable pin member.

* * * * *